US012735058B2

(12) United States Patent
Schmidt et al.

(10) Patent No.: US 12,735,058 B2
(45) Date of Patent: Sep. 15, 2026

(54) AUTOMOTIVE PERCEPTION BASED ON A FUSED SENSOR GRAPH

(71) Applicant: Bayerische Motoren Werke Aktiengesellschaft, Munich (DE)

(72) Inventors: Sebastian Schmidt, Munich (DE); Hui Zeng, Garching bei Muenchen (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 85 days.

(21) Appl. No.: 18/789,833

(22) Filed: Jul. 31, 2024

(65) Prior Publication Data

US 2025/0042423 A1 Feb. 6, 2025

(30) Foreign Application Priority Data

Aug. 1, 2023 (EP) .................................... 23189076

(51) Int. Cl.
*B60W 50/06* (2006.01)
*G06F 16/901* (2019.01)

(52) U.S. Cl.
CPC ......... *B60W 50/06* (2013.01); *G06F 16/9024* (2019.01)

(58) Field of Classification Search
CPC .......................... B60W 50/06; G06F 16/9024
See application file for complete search history.

(56) References Cited

U.S. PATENT DOCUMENTS

2023/0110132 A1* 4/2023 Liu ......................... H04W 4/12 455/412.1

FOREIGN PATENT DOCUMENTS

CN 115861755 A * 3/2023

OTHER PUBLICATIONS

Espacenet, English Translation of CN115861755A (Year: 2023).*
Extended European Search Report issued in European Application No. 23189076.5 dated Nov. 20, 2023 (5 pages).
Han, K. et al., "Vision GNN: An Image is Worth Graph of Nodes", Cornell University Library, 201 Olin Library, Cornell University Ithaca, ARXIV.Org, Jun. 1, 2022, pp. 1-14, XP091236494 (14 pages).

* cited by examiner

*Primary Examiner* — Naeem Taslim Alam
(74) *Attorney, Agent, or Firm* — Crowell & Moring LLP

(57) ABSTRACT

A method for generating a fused automotive sensor data graph as well as an automotive control unit configured to perform the method are disclosed. A plurality of automotive sensor data graphs is obtained, which are each based on sensor data captured by a corresponding automotive sensor of the vehicle. At least one calibration matrix is obtained, which defines a transformation between sensor data nodes of at least two automotive sensor data graphs. Based on the plurality of automotive sensor data graphs and the at least one calibration matrix, the fused automotive sensor data graph is generated, which includes the plurality of automotive sensor data graphs as well as a plurality of fusion edges. The fused automotive sensor data graph is provided to an automotive perception function, which is implemented by a graph neural network.

20 Claims, 6 Drawing Sheets

AUTOMOTIVE PERCEPTION BASED ON A FUSED SENSOR GRAPH

CROSS REFERENCE TO RELATED APPLICATION

This application claims priority under 35 U.S.C. § 119 from European Patent Application No. 23189076.5, filed Aug. 1, 2023, the entire disclosure of which is herein expressly incorporated by reference.

BACKGROUND AND SUMMARY

The invention generally relates to automotive computer vision and more precisely to processing sensor data from multiple automotive sensors of a vehicle.

To enable advanced driver-assistance systems (ADAS), a modern vehicle typically includes a plurality of automotive sensors of various sensor types, which may provide the vehicle with sensor data based on the environment of the vehicle. The sensor data of the plurality of automotive sensors may be processed by an automotive processing unit in order to identify objects, such as other vehicles, vulnerable road users (VRUs), traffic signs, traffic lights and lane markings. The sensor data of the plurality of sensors may be combined in a two-dimensional grid or a three-dimensional grid in order to enable joint processing of the sensor data using processing approaches used in image processing. To form such grids, empty cells need to be added, which increases storage requirements and prolongs processing times as the empty cells need to be processed as well. Additionally, the formation of such grids causes discretization of the sensor data and thereby leads to a loss of information.

To address these issues, approaches exist to form an initial automotive sensor data graph based on the sensor data of one automotive sensor of the plurality of automotive sensors. Based on the initial automotive sensor data graph, the sensor data of the other automotive sensors of the plurality of sensors is added to the nodes of the initial automotive sensor data graph to enrich the information of the nodes in the automotive sensor data graph, thereby forming a concatenated automotive sensor data graph. The concatenated automotive sensor graph may then be processed by a machine learning model, such as an artificial neural network. However, the concatenated automotive sensor graph only includes the nodes and edges of the initial automotive sensor. Since the edges encode relative distances and locational information between points of data of the automotive sensor used to form the initial automotive sensor, the concatenated automotive sensor graph does not include any relative distances and locational information of the other automotive sensors of the plurality of automotive sensors. As the nodes of the initial automotive sensor data graph are enriched, only a subset of data from the other automotive sensors of the plurality of automotive sensors are used, which leads to information loss. Further, since each node of the concatenated automotive sensor graph includes sensor data of various sensors and thus various sensor types, training the machine model may need to be trained multiple times.

Therefore, it is an objective of the present disclosure to combine the sensor data of a plurality of automotive sensors without information loss and to process the sensor in a manner requiring less training effort as well as less computational effort.

To achieve this objective, the present disclosure provides a method for generating a fused automotive sensor data graph. The method comprises obtaining a plurality of automotive sensor data graphs. Each automotive sensor data graph is based on sensor data captured by a corresponding automotive sensor of a plurality of automotive sensors. Each automotive sensor data graph comprises a plurality of sensor data nodes and a plurality of sensor data edges. Each sensor data node includes sensor data captured by the corresponding automotive sensor. Each sensor data edge defines a sensor distance relationship between two sensor data nodes of the plurality of sensor data nodes. The method further comprises obtaining at least one calibration matrix, the at least one calibration matrix defining a transformation between respective pluralities of sensor data nodes of at least two automotive sensor data graphs and generating the fused automotive sensor data graph based on the plurality of automotive sensor data graphs and the at least one calibration matrix. The fused automotive sensor data graph comprises a plurality of fused automotive sensor data nodes and a plurality of fused automotive sensor data edges. The plurality of fused automotive sensor data nodes includes all pluralities of sensor data nodes. The plurality of fused automotive sensor data edges comprises all pluralities of sensor data edges and a plurality of fusion edges. Each fusion edge defines a fusion distance relationship between two sensor data nodes of two pluralities of sensor data nodes. Finally the method comprises providing the fused automotive sensor data graph to an automotive perception function, the automotive perception function being implemented by a graph neural network and being configured to generate perception data based on the fused automotive sensor data graph.

The present disclosure further provides an automotive control unit comprising at least one processing unit and a memory coupled to the at least one processing unit and configured to store machine-readable instructions. The machine-readable instructions cause the at least one processing unit to perform the method for generating a fused automotive sensor data graph.

The present disclosure further provides a vehicle comprising a plurality of sensors, and the automotive control unit.

Examples of the present disclosure will be described with reference to the following appended drawings, in which like reference signs refer to like elements.

Other objects, advantages and novel features of the present invention will become apparent from the following detailed description of one or more preferred embodiments when considered in conjunction with the accompanying drawings.

It should be understood that the above-identified drawings are in no way meant to limit the present disclosure. Rather, these drawings are provided to assist in understanding the present disclosure. The person skilled in the art will readily understand that aspects of the present invention shown in one drawing may be combined with aspects in another drawing or may be omitted without departing from the scope of the present disclosure.

DETAILED DESCRIPTION OF THE DRAWINGS

The present disclosure generally provides a method for generating a fused automotive sensor data graph, an automotive control unit configured to generate the fused automotive sensor data graph and a vehicle including the automotive control unit. The fused automotive sensor data graph combines the sensor data captured by a plurality of automotive sensors of the vehicle in a single graph. To this end, the method and the automotive control unit obtain a plurality of automotive sensor data graphs, which are respectively based on sensor data of the plurality of automotive sensor data, and add all sensor data nodes and all sensor data edges to the fused automotive sensor data graph as fused automotive sensor data nodes and fused automotive sensor data edges. Further the method and the automotive control unit generate a plurality of fusion edges between sensor data nodes of different automotive sensor data graphs based on a transformation defined by at least one calibration matrix. The fusion edges likewise form part of the fused automotive sensor data edges. Accordingly, the fusion edges cause the fused automotive sensor data graph to be a connected graph, i.e. due to the fusion edges, a sequence of fused automotive sensor data edges connecting each pair of fused automotive sensor data nodes exists. The fused automotive sensor data graph is then provided to an autonomous perception function, which is implemented by a graph neural network, in order to generate perception data, i.e. data defining aspects of the environment of the vehicle.

Since the fused automotive sensor data graph includes the sensor data nodes and the sensor data edges of all automotive sensor data graphs, the fused automotive sensor data graph retains all information provided by the plurality of automotive sensors. Moreover, since each fused automotive sensor node includes sensor data of a specific type of sensor, training the graph neural network is simplified compared with sensor data graphs including multiple types of sensor data in a node. This is due to the fact that neurons of the graph neural network receiving sensor data of a respective fused automotive sensor node as input only need to be trained with regard to one type of sensor data. Further, the training for all types of sensor data may be performed concurrently given the structure of the fused automotive sensor data graph.

Figure 5:
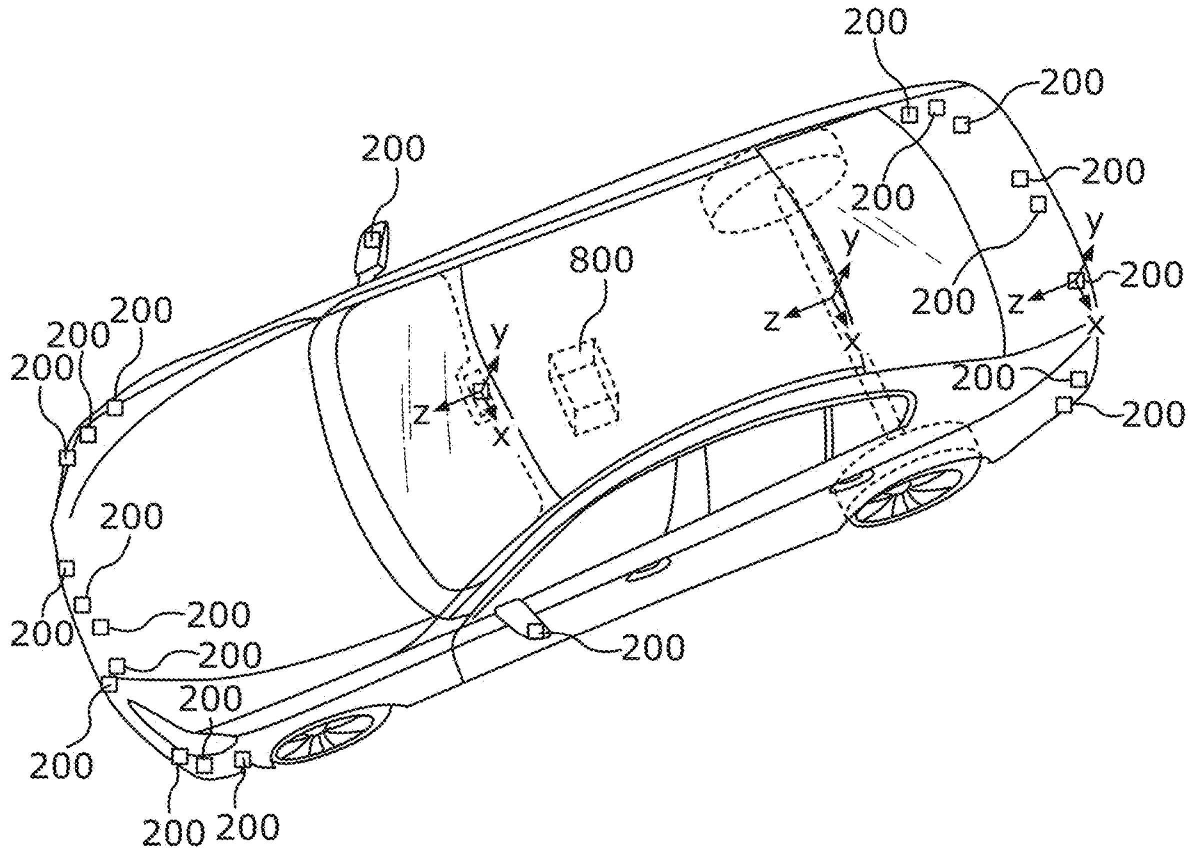
FIG. 5 illustrates a vehicle including a plurality of automotive sensors according to examples of the present disclosure.
Figure 6:
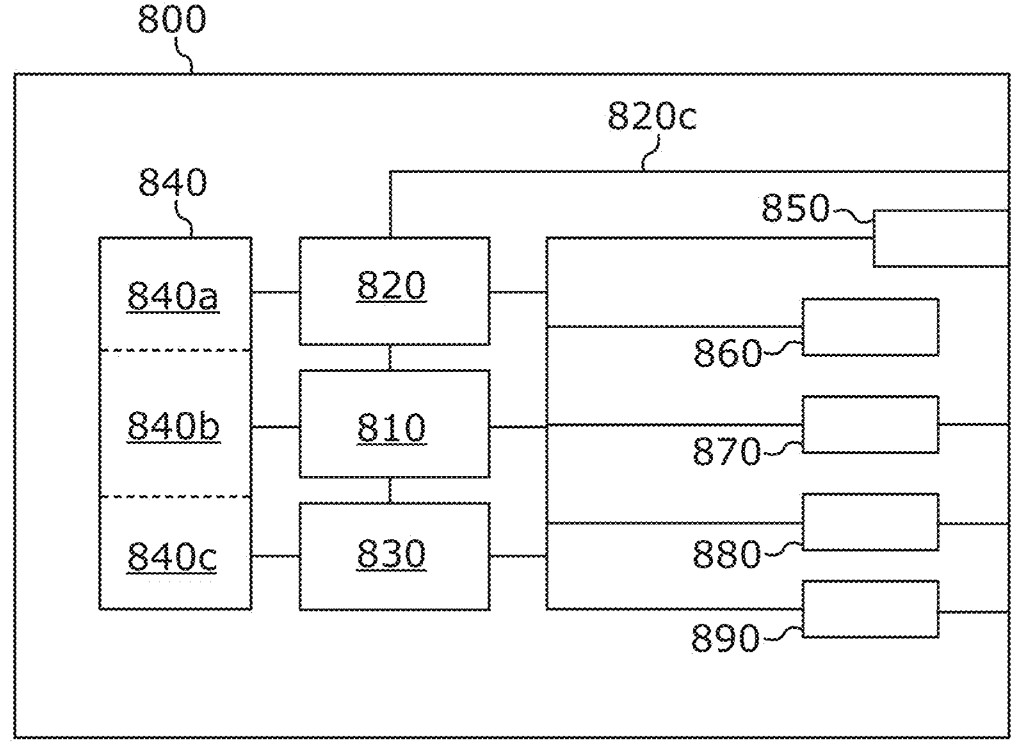
FIG. 6 illustrates an automotive control unit according to examples of the present disclosure.

This general concept will now be explained with reference to the appended drawings, with FIG. 1 providing a flowchart of the method for generating the fused automotive sensor data graph and FIGS. 2 to 4 further illustrating the method either in general or specific aspects thereof. FIG. 5 illustrates the vehicle including the plurality of automotive sensors and the automotive control unit. Finally, FIG. 6 illustrates an example of the automotive control unit in more detail.

Figure 1:
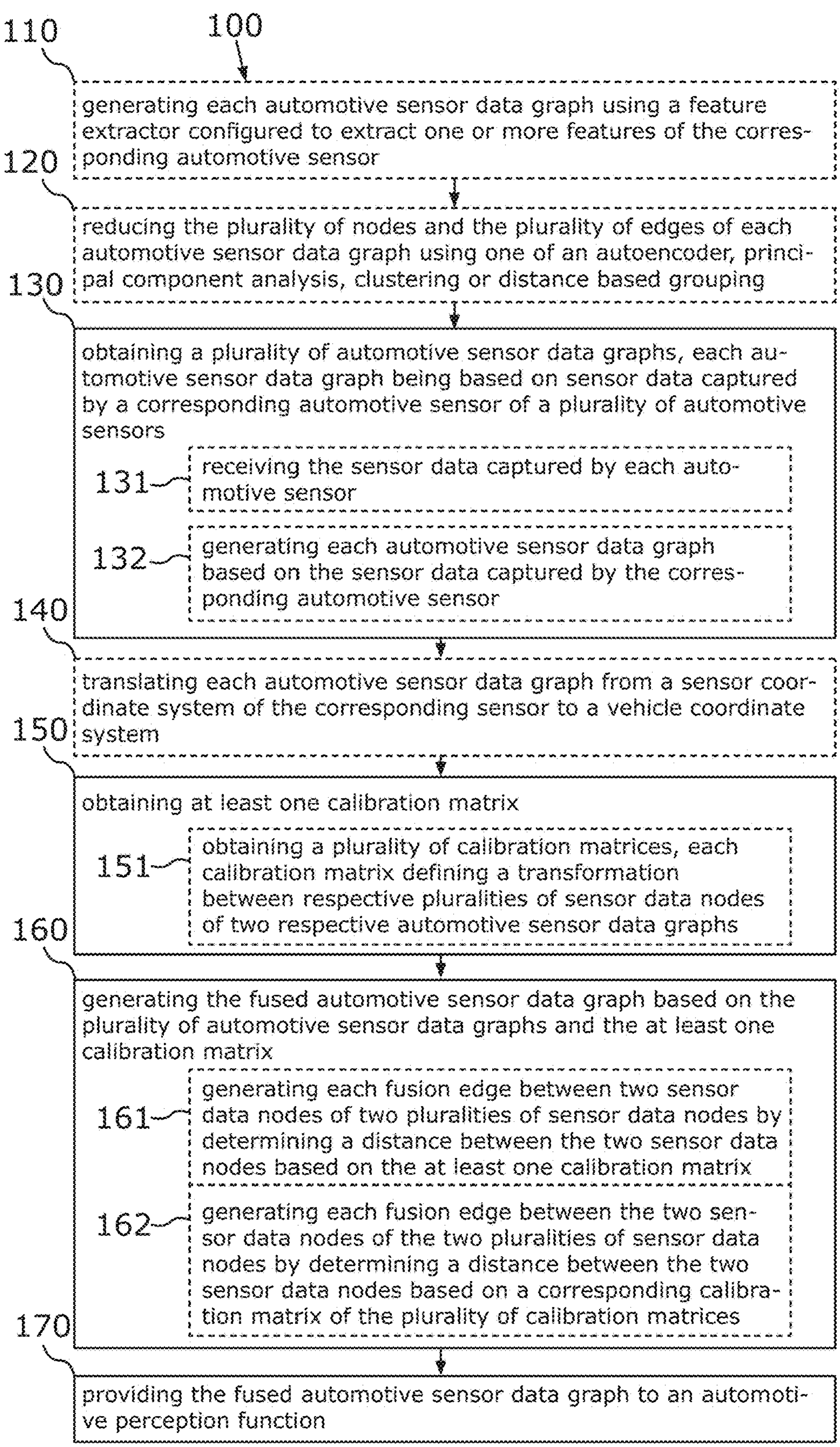
FIG. 1 provides a flowchart of a method for generating a fused automotive sensor data graph according to examples of the present disclosure.

FIG. 1 provides a flowchart of method 100 for generating the fused automotive sensor data graph. Substeps of steps of method 100 are shown as boxes inside the boxes of the corresponding steps. Optional steps are illustrated as dashed boxes. Method 100 may be performed by automotive control unit 800 of FIG. 6.

In step 130, method 100 obtains a plurality of automotive sensor data graphs. Each automotive sensor data graph is based on sensor data captured by a corresponding automotive sensor 200 of a plurality of automotive sensors.

As shown in FIG. 5, a vehicle may comprise automotive sensors 200 at various positions in and around the vehicle. Each automotive sensor 200 may be configured to capture sensor data indicative of the environment of the vehicle. To this end, the automotive sensors 200 may be radar sensors, which may be configured to emit radio waves in order to determine a distance, an angle and a velocity of objects around the vehicle based on the reflected radio waves. The automotive sensors 200 may be light detection and ranging (LIDAR) sensors, which are configured to emit laser beams in order to determine a distance, an angle and a velocity of objects around the vehicle based on the reflected laser beams. The automotive sensors 200 may be cameras, which capture images of the environment of the vehicle. The automotive sensors 200 may be thermographic cameras, which capture images of the environment of the vehicle based on infrared radiation. It will be understood that LIDAR sensors, radar sensors or cameras are merely provided as examples of sensor types of automotive sensors 200. For example, the automotive sensors may also be ultrasonic sensors. More generally, automotive sensors 200 may be any type of sensor capable of capturing sensor data indicative of the environment of the vehicle. It will further be understood that the plurality of automotive sensors may include multiple sensors of various types of sensors. Further, automotive sensors 200 of the same type may exhibit different properties, e.g. by being configured to capture sensor data at different ranges, such as a close range, a middle range and a far range. For example, the vehicle may include three close range radar sensors each at a front and a back of the vehicle, a middle range to far range radar sensor at the back of the vehicle, a LIDAR sensor at the front of the vehicle, a rear-facing camera at the back of the vehicle, a front-facing camera at the front of the vehicle, a front-facing camera at the rear-view mirror and a rear-facing close range to middle range radar sensor in each door-mounted outer rear view mirror. It will be understood that the vehicle may include more or fewer automotive sensors than shown in FIG. 5 and discussed in the above example.

The information included in the sensor data may depend on the type of automotive sensor providing the sensor data. If the automotive sensor is a camera, the sensor data may correspond to image data, such as RGB values and a brightness value for each pixel captured by the camera. If the automotive sensor is a radar sensor, the sensor data may correspond radar data, which may e.g. include a return time, an intensity, an angle and a frequency of a detected radio wave. If the automotive sensor is a LIDAR sensor, the sensor data may correspond to LIDAR data, which may e.g. include a return time, an angle and an intensity a detected laser beam. More generally, the sensor data of each automotive sensor 200 may be raw sensor data as captured by the respective automotive sensor. In some examples, the sensor data may also be sensor data processed by the respective automotive sensor 200 prior to generation of the respective automotive sensor data graph, e.g. in order to reduce the amount of sensor data in view of storage or complexity requirements, as will be discussed with reference to steps 110 and 120.

Each automotive sensor data graph comprises a plurality of sensor data nodes and a plurality of sensor data edges. Each automotive sensor data graph $G_S$ may thus be expressed as shown in equation (1):

$$G_{Sn}=(V_{Sn},E_{Sn}) \quad (1)$$

In equation (1), Vs denotes the plurality of sensor data nodes, which may also be referred to as vertices, $E_S$ denotes the plurality of sensor data edges and n denotes the nth automotive sensor data graph $G_{Sn}$.

The plurality of sensor data nodes Vs may be expressed as a set of sensor data nodes including k sensor data nodes v, as shown in equation (2):

$$V_S=\{v_1, \ldots , v_k\} \quad (2)$$

Each sensor data node v includes the sensor data captured by one of the automotive sensors 200 discussed above, which may be raw sensor data or processed sensor data.

The plurality of sensor data edges $E_S$ may be expressed as a set of sensor data nodes including l sensor data edges e, as shown in equation (3):

$$E_S=\{e_1, \ldots , e_l\} \quad (3)$$

Each sensor data edge e defines a sensor distance relationship between two sensor data nodes v. Based on the sensor distance relationship, the sensor data edges define the relative distance between points of sensor data captured by one of the automotive sensors 200. Taking a camera as an example, each sensor data node v may include information of a pixel or averaged information of a pixel group captured by the camera. Each sensor data edge in this example defines the relative distance between the pixel or the pixel group and other pixels or pixel groups captured by the camera. Taking a LIDAR sensor as a further example, the sensor data may be a point cloud. Each sensor data node may thus correspond to a point or an average of a group of points of the point clouds. Accordingly, each sensor data edge e in this example defines the relative distance between points or point groups of the point cloud. The distance relationship may thus refer to both a distance in two dimensions as well as in three dimensions. It will be understood that the distance relationship may be used to infer locational information of the respective sensor data within each automotive sensor data graph.

The sensor distance relationship serves as a rule defining which relative distances are to be included in the automotive sensor data graph. Accordingly, the sensor distance relationship may be one of a n-nearest-neighbors relationship, a fixed-radius-relationship and a weighted-distance-relationship. In the case of the sensor distance relationship being the n-nearest-neighbors relationship, the plurality of sensor data edges includes edges incident on one sensor data node v corresponding to the n shortest relative distances between the point of sensor data associated with the one sensor data node v and points of sensor data of neighboring sensor data nodes. In the case of the sensor distance relationship being the fixed-radius-relationship, the plurality of sensor data edges includes edges incident on one sensor data node v corresponding to relative distances between the point of sensor data associated with the one sensor data node v and points of sensor data of neighboring sensor data nodes which are shorter than a threshold distance. In the case of the sensor distance relationship being the weighted-distance-relationship, the plurality of sensor data edges includes edges between all sensor data nodes of the respective sensor data graph with each relative distance weighted by an average distance between all sensor data nodes of the respective automotive sensor data graph. It will be understood that the distance relationships are merely examples of distance relationships and the sensor data edges within each respective automotive sensor data graph may be defined based on any distance relationship suitable to serve as a rule for defining which relative distances to indicate in the respective automotive sensor data graph.

To obtain the plurality of automotive sensor data graphs, method 100 may include steps 131 and 132. In step 131, method 100 may receive the sensor data captured by each automotive sensor. In step 132, method 100 may generate each automotive sensor data graph based on the received sensor data.

Method 100 may include step 110, in which method 100 generates each automotive sensor data graph using a feature extractor configured to extract one or more features of the corresponding automotive sensor. The feature extractor may be any kind of data processing approach configured to identify one or more features. More precisely, the feature extractor may be configured to transform the sensor data from a sensor data space to a feature space, with the number of features to extracted defining the dimensionality of the feature space. Accordingly, the sensor data nodes of the automotive sensor data graphs generated using a feature extractor may include a vector indicating identified one or more features of the sensor data. The feature extractor may for example be a neural network, such as a residual neural network (ResNet). By generating each automotive sensor data graph using a feature extractor, the amount of sensor data and thus the amount of sensor data nodes may be reduced, leading to smaller automotive sensor data graphs and thus to a smaller fused automotive sensor data graph without or with minimal loss of information about the environment of the vehicle.

Method 100 may include step 130, in which method 100 reduces the plurality of nodes and the plurality of edges of each automotive sensor data graph. To reduce the plurality of nodes and the plurality of edges in step 130, method 100 may employ one of an autoencoder, principal component analysis, clustering or distance based grouping.

While steps 110 and 120 are illustrated and discussed as preceding step 130, i.e. the step of obtaining the plurality of automotive sensors, it will be understood that steps 110 and 120 may be substeps of step 130, similar to steps 131 and 132. That is, method 100 may, as part of obtaining the plurality of automotive sensor data graphs, generate the plurality of automotive sensor data graphs using a feature extractor based on sensor data received in step 131 and may subsequently reduce the plurality of nodes and the plurality of edges as discussed with regard to step 120.

Method 100 may include step 140, in which method 100 translates each automotive sensor data graph from a sensor coordinate system of the corresponding sensor to a vehicle coordinate system. Each automotive sensor 200 shown in FIG. 5 has a sensor coordinate system, as exemplarly illustrated for two automotive sensors 200 by a respective three-dimensional cartesian coordinate system. To enable the subsequent fusion of the plurality of automotive sensor data graphs and the processing of the sensor data included in the plurality of automotive sensor data graphs in step 170, each automotive sensor data graph may be translated from the respective sensor coordinate system to the vehicle coordinate system. The vehicle coordinate system may have an origin centered on a component of the vehicle, such as the center of the rear axle of the vehicle, as shown in FIG. 5. The vehicle coordinate system may also be centered on any other component of the vehicle or the centroid of the vehicle. It will be understood that translating each automotive sensor data graph includes translating the sensor data included in the respective sensor data nodes as well as the relative distances included in the respective sensor data edges so that the sensor data and the relative distances are referenced to the vehicle coordinate system.

In step 150, method 100 obtains at least one calibration matrix. The at least one calibration matrix defines a transformation between respective pluralities of sensor data nodes of at least two automotive sensor data graphs. In other words, the calibration matrix enables mapping sensor data nodes of two or more automotive sensor data graphs onto one another. The concept of the calibration matrix will be discussed in the following with reference to FIG. 4.

Figure 4:
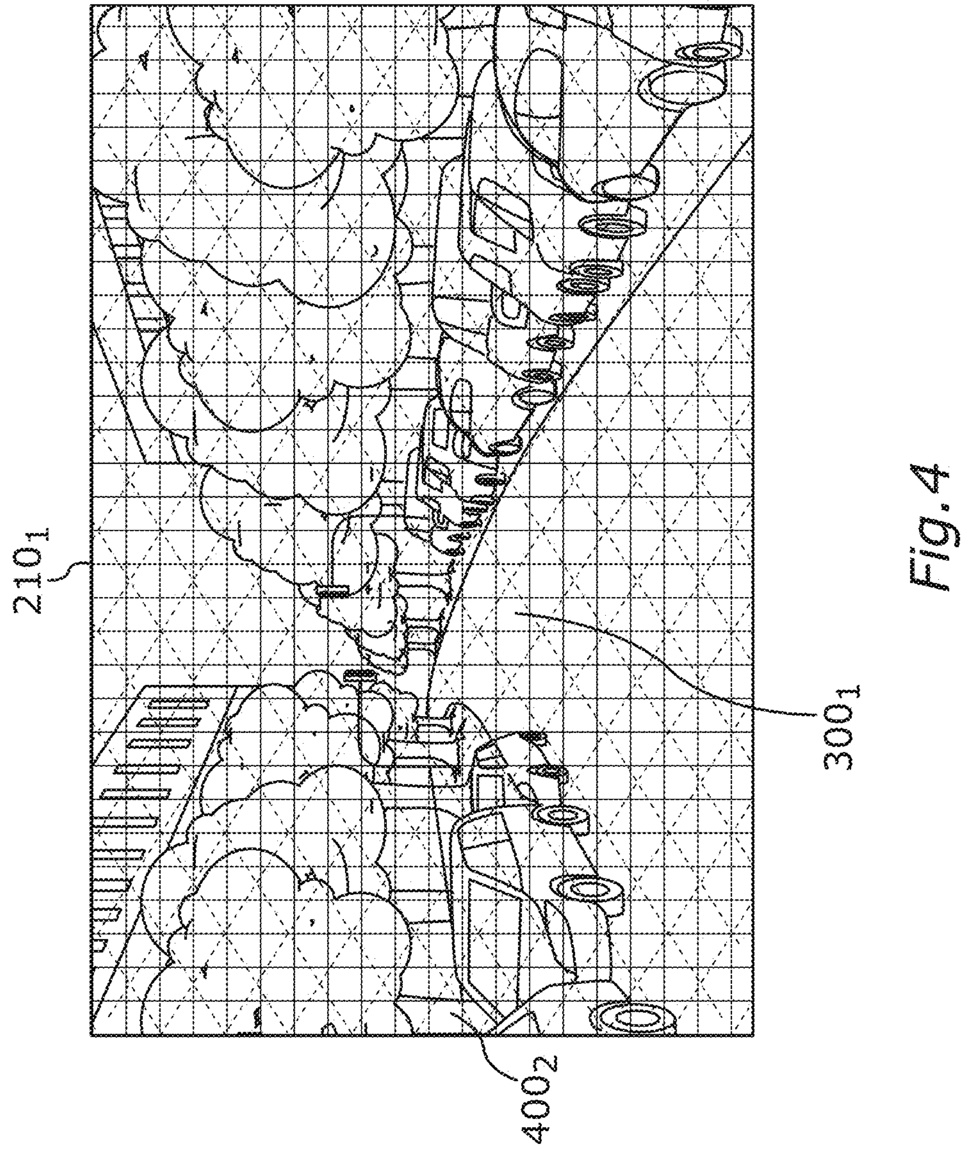
FIG. 4 illustrates a calibration matrix with respect to an automotive sensor data graph of a camera and an image captured by the camera according to examples of the present disclosure.

FIG. 4 provides an example of a calibration matrix 4002 overlaid over sensor data 2101 of an automotive sensor 2001, which are illustrated as a camera image, and an automotive sensor data graph 3001 generated based on sensor data 2101. Calibration matrix 4002 corresponds to the location of sensor data of an automotive sensor 2002 and indicates the locations of all data points of the sensor data in relative to automotive sensor data graph 3001. As can be seen from this example, the calibration matrix thus defines the transformation or mapping between respective pluralities of sensor data nodes by indicating the locations of sensor data points of the sensor data of one automotive sensor 200 relative to sensor data points of the sensor data of another automotive sensor 200.

In order to serve the above-discussed purpose, the at least one calibration matrix may be based on a calibration of two automotive sensors with regard to one another. That is, the calibration matrix may be based on a determination how the sensor data captured by one automotive sensor 200 relate to the sensor data captured by another automotive sensor 200 in view of the environment of the vehicle.

Method 100 may obtain at least one calibration matrix in step 150. That is, if method 100 obtains a single calibration matrix, a calibration matrix determined for one automotive sensor 200 relative to another automotive sensor 200 may be used as an approximation of the mapping of sensor data locations between all automotive sensors 200 in order to simplify the subsequent generation of the fused automotive sensor graph. Depending on accuracy requirements and the difference between the locations of the plurality of automotive sensors, step 150 may also include a step 151, in which method 100 obtains a plurality of calibration matrices with each calibration matrix defining a transformation between respective pluralities of sensor data nodes of two respective automotive sensor data graphs. In other words, if method 100 is implemented with step 151, method 100 may subsequently generate the fused automotive sensor data graph based on one calibration matrix per pair of automotive sensors 200. It will be understood that method 100 may obtain a single calibration matrix, a plurality of calibration matrices or any number in between these two extrema, for example a calibration matrix transforming or mapping sensor data points of sensor data of front-facing automotive sensors 200 between one another, a calibration matrix transforming or mapping sensor data points of sensor data of rear-facing automotive sensors 200 between one another and two calibration matrices analogously mapping sensor data points of sensor data of side-facing automotive sensors 200 between one another.

In step 150, method 100 generates the fused automotive sensor data graph based on the plurality of automotive sensor data graphs and the at least one calibration matrix.

The fused automotive sensor data graph comprises a plurality of fused sensor data nodes and a plurality of fused sensor data edges. Each fused automotive sensor data graph $G_F$ may thus be expressed as shown in equation (4):

$$G_F = (V_F, E_F) \tag{4}$$

In equation (4), $V_F$ denotes the plurality of fused sensor data nodes, which may also be referred to as vertices and $E_F$ denotes the plurality of fused sensor data edges. The plurality $V_F$ of fused sensor data nodes includes all pluralities of sensor data nodes. Based on equations (1) and (2), the plurality of fused sensor data nodes $V_F$ may thus be expressed as shown in equation (5):

$$V_F = \{V_{S1}, \ldots , V_{Sn}\} \tag{5}$$

Further, the plurality of fused sensor data edges $E_F$ comprises all pluralities of sensor data edges and a plurality of fusion edges $E_{fu}$. Based on equations (1) and (3), the plurality of fused sensor data edges $E_F$ may thus be expressed as shown in equation (6):

$$E_F = \{E_{S1}, \ldots , E_{Sn}, E_{fu}\} \tag{6}$$

The plurality of fusion edges $E_{fu}$ may be expressed as a plurality of m fusion edges $e_{fu}$, as shown in equation (7):

$$E_F = \{e_{fu1}, \ldots , e_{fum}\} \tag{7}$$

Each fusion edge $e_{fu}$ defines a fusion distance relationship between two sensor data nodes of two pluralities of sensor data nodes. Similar to the sensor data edges e discussed above, the fusion edges $e_{fu}$ define the relative distance between one point of sensor data captured by one automotive sensor 200 and another point of sensor data captured by another automotive sensor 200 based on the fusion distance relationship. Accordingly, the difference between the sensor data edges e and the fusion edges $e_{fu}$ is that the sensor data edges e define relative distances between sensor data nodes of the same automotive sensor data graph while the fusion edges define relative distances between sensor data nodes of different automotive sensor data graphs. Accordingly, the fusion edges connect the pluralities of sensor data nodes with one another in order to ensure that the fused automotive sensor data graph is a connected graph.

Like the sensor distance relationship, the fusion distance relationship may be one of an n-nearest-neighbors relationship, a fixed-radius-relationship and a weighted-distance-relationship.

Step 160 may include a step 161, in which method 100 generates each fusion edge $e_{fu}$ between two sensor data nodes of two pluralities of sensor data nodes by determining a distance between the two sensor data nodes based on the at least one calibration matrix. If method 100 obtains a plurality of calibration matrices as part of step 150, step 160 may include a step 162, in which method 100 generates each fusion edge $e_{fu}$ between the two sensor data nodes of the two pluralities of sensor data nodes by determining a distance between the two sensor data nodes based on a corresponding calibration matrix of the plurality of calibration matrices. In other words, method 100 may determine relative distances between sensor data nodes of different automotive sensor data graphs based on the at least one calibration matrix and include the determined relative distance in the fusion edges $e_{fu}$.

Step 160 may further include a substep (not shown), in which method 100 fuses the sensor data comprised in each sensor data node. In other words, method 100 may, as part of step 160, combine the sensor data comprised in each sensor node by mapping the comprised sensor data to a sensor data space with reduced dimensionality in order to further reduce storage and computational requirements. This fusing of the sensor data across the automotive sensor data graph may additionally increase the result quality of 170.

Figure 3A:
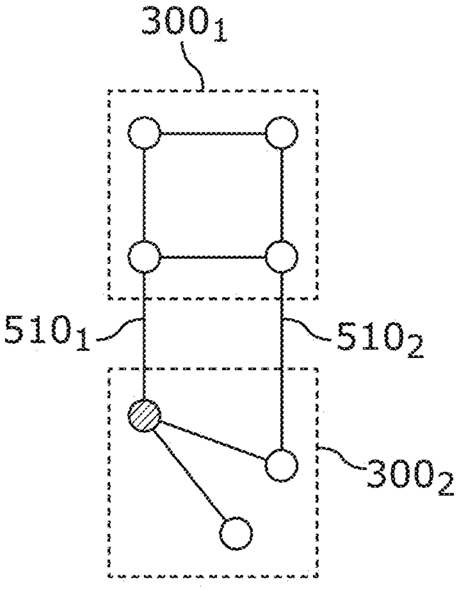
FIGS. 3A and 3B illustrating a transformation between data nodes of automotive sensor data graphs according to examples of the present disclosure.
Figure 3B:
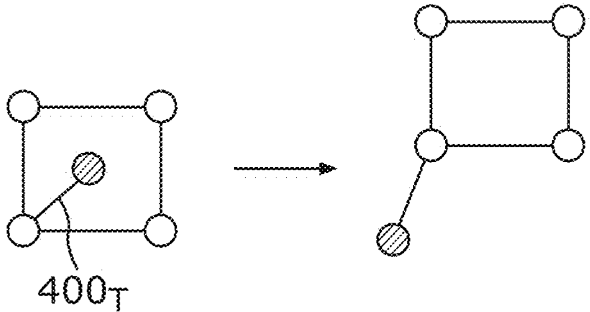

As discussed above with regard to FIG. 4, the at least one calibration matrix defines the transformation or mapping between respective pluralities of sensor data nodes by indicating the locations of sensor data points of the sensor data of one automotive sensor 200 relative to sensor data points of the sensor data of another automotive sensor 200. FIGS. 3A and 3B illustrate the generation of the fusion edges $e_{fu}$ in view of the indication provided by the at least one calibration matrix.

FIG. 3A shows an automotive sensor data graph 3001 and an automotive sensor data graph 3002, which have already been connected by exemplary fusion edges 5101 and 5102. In FIG. 3A, one data sensor node is highlighted in order to illustrate the generation of fusion edge 5101 based on the at least one calibration matrix. In FIG. 3B, the highlighted data sensor node is shown based on the relative position of the highlighted data sensor node with regard to automotive sensor data graph 3001 and a corresponding transformation 400T, which is determined based on the at least one calibration matrix. Based on transformation 400T, the relative distance between the highlighted data sensor node and automotive sensor data graph 3001 is determined and included in fusion edge 5101, as indicated by the arrow and the changed position of the highlighted data sensor node in FIG. 3B.

In step 170, method 100 provides the fused automotive sensor data graph to an automotive perception function. The automotive perception function is implemented by a graph neural network and is configured to generate perception data based on the fused automotive sensor data graph. The automotive perception function may be any type of automotive computer vision function configured to derive information about the environment of the vehicle from the sensor data of the plurality of automotive sensors as included in the fused automotive sensor data graph. For example, the automotive perception function may be configured to implement semantic segmentation, instance segmentation and/or object detection. It will be understood that these functionalities are merely provided as exemplary functionality implemented by the automotive perception function and that the automotive perception function may implement any automotive computer vision functionality aiding the vehicle in implementing one or more ADAS provided in the vehicle. Accordingly, the perception data may be configured to be processed by the one or more ADAS.

In some examples of the present disclosure, the automotive perception function may include further processing steps in addition to the processing implemented by the graph neural network. For example, in order to improve the perception data provided by the automotive perception function may include processing based on deep fusion, i.e. by updating the sensor data between fused automotive sensor data nodes and thereby by exchanging information between the fused automotive sensor data nodes. As a further example, the automotive perception function may additionally include Kalman filtering.

The graph neural network may be any type of neural network accepting a graph as input and outputting one or more pieces of information, such as identified objects, as perception data. As discussed above, since each fused automotive sensor data node of the fused automotive sensor data graph only includes sensor data of a specific type of automotive sensor, training of the graph neural network rendered less complex given that each neuron only needs to be trained only with training data corresponding to the respective sensor type.

Figure 2:
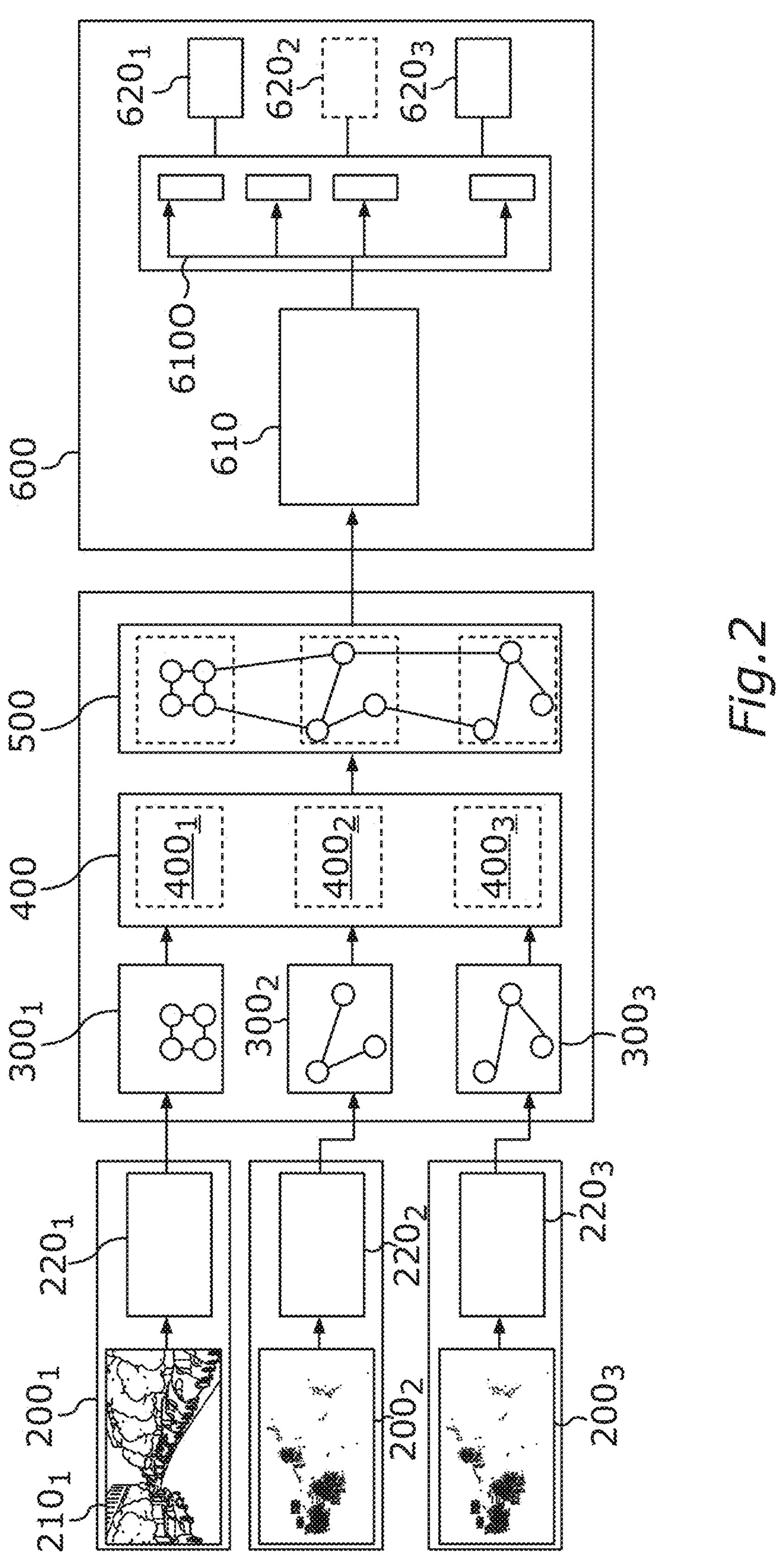
FIG. 2 illustrates processing of sensor data based on the generation of the fused automotive sensor data graph according to examples of the present disclosure.

FIG. 2 illustrates processing of the sensor data in accordance with method 100 in order to generate the fused automotive sensor data graph and to process the fused automotive sensor data graph with a graph neural network. To this end, FIG. 2 illustrates automotive sensors 2001 to 2003, automotive sensor data graphs 3001 to 3003, calibration matrix 400, fused automotive sensor data graph 500 and automotive perception processing 600.

For each automotive sensor 2001 to 2003, FIG. 2 illustrates exemplary sensor data 2101 to 2103, as well as sensor processing 2201 to 2203. Sensor processing 2201 to 2203 may optionally implement steps 110 and 120 if method 100 obtains the plurality of automotive sensor data graphs without generating them. If method 100 generates the automotive sensor data graphs, sensor processing 2201 to 2203 may be omitted.

Calibration matrix 400 is illustrated in FIG. 2 as including three separate calibration matrices 4001 to 4003. Calibration matrix 400 is illustrated in this manner in order to illustrate the fact that there may be at least one calibration matrix up to a plurality of calibration matrices 4001 to 4003, depending on how many calibration matrices are obtained in step 150.

Fused automotive sensor graph 500 is illustrated in FIG. 2 as comprising automotive sensor data graph 3001 connected via two fusion edges to automotive sensor data graph 3002, which is connected to automotive sensor data graph 3003 again via two fusion edges. It will be understood that this example is merely meant as an oversimplified example. For example, automotive sensor data graph 3003 may also be connected based on the generation of the plurality of fusion edges also to automotive graph 3001. Further, fusion graph 500 may be a three-dimensional graph, given that at least some of the sensor data may be point clouds.

Automotive perception processing 600 may include automotive perception function 610, as discussed above with regard to step 170, which generates perception data 6100. Perception data 6100 may include various pieces of derived information, as indicated by the various boxes within perception data 6100. Perception data 6100 may then be provided to a plurality of ADAS 6201 to 6203.

As mentioned above, method 100 may be implemented by automotive control unit 800, which will be discussed in the following.

FIG. 6 shows automotive control unit 800 configured to perform method 100. automotive control unit 800 may include a processor 810, a graphics processing unit (GPU) 820, automotive processing system 830, a memory 840, a removable storage 850, a storage 860, a cellular interface 870, a global navigation satellite system (GNSS) interface 880 and a communication interface 890.

Processor 810 may be any kind of single-core or multi-core processing unit employing a reduced instruction set (RISC) or a complex instruction set (CISC). Exemplary RISC processing units include ARM based cores or RISC V based cores. Exemplary CISC processing units include x86 based cores or x86-64 based cores. Processor 810 may perform instructions causing automotive control unit 800 to perform method 100. Processor 810 may be directly coupled to any of the components of computing device 800 or may be directly coupled to memory 830, GPU 820 and a device bus.

GPU 820 may be any kind of processing unit optimized for processing graphics related instructions or more generally for parallel processing of instructions. As such, GPU 420 may be configured to generate a display of information, such as ADAS information or telemetry data, to a driver of the vehicle, e.g. via a head-up display (HUD) or a display arranged within the view of the driver. GPU 820 may be coupled to the HUD and/or the display via connection 820. GPU 820 may further perform part of method 100 to enable fast parallel processing of instructions relating to method 100, such as processing sensor data nodes while generating the fused automotive sensor data graph. It should be noted that in some embodiments, processor 810 may determine that GPU 820 need not perform instructions relating to method 100. GPU 820 may be directly coupled to any of the components of computing device 400 or may be directly coupled to processor 810 and memory 830. In some embodiments, GPU 420 may also be coupled to the device bus Automotive processing system 830 may be any kind of system-on chip configured to provide trillions of operations per second (TOPS) in order to enable automotive control unit 800 to implement one ore more ADAS and method 100 while driving. Automotive processing system 830 may interface only with processor 810 or may interface with other devices via the system bus.

Memory 840 may be any kind of fast storage enabling processor 810 GPU 820 and automotive processing system 830 to store instructions for fast retrieval during processing of instructions as well as to cache and buffer data. Memory 840 may be a unified memory coupled to processor 810 and GPU 820 and automotive processing system 830 in order to enable allocation of memory 840 to processor 810, GPU 820 and automotive processing system 830 as needed. Alternatively, processor 810, GPU 820 and automotive processing system 830 may be coupled to separate processor memory 840*a*, GPU memory 840*b* and automotive processing system memory 840*c*.

Removable storage 850 may be a storage device which can be removably coupled with automotive control unit 800. Examples include a digital versatile disc (DVD), a compact disc (CD), a Universal Serial Bus (USB) storage device, such as an external SSD, or a magnetic tape. It should be noted that removable storage 850 may store data, such as instructions of method 100, or may be omitted.

Storage 860 may be a storage device enabling storage of program instructions and other data. For example, storage 860 may be a hard disk drive (HDD), a solid state disk (SSD) or some other type of non-volatile memory. Storage 860 may for example store the instructions of method 100.

Removable Storage 850 and storage 860 may be coupled to processor 810 via the system bus. The system bus may be any kind of bus system enabling processor 810 and optionally GPU 820 as well as automotive processing system 830 to communicate with the other devices of automotive control unit 800. Bus 440 may for example be a Peripheral Component Interconnect express (PCIe) bus or a Serial AT Attachment (SATA) bus.

Cellular interface 870 may be any kind of interface enabling automotive control unit 800 to communicate via a cellular network, such as a 4G network or a 5G network.

GNSS interface 880 may be any kind of interface enabling automotive control unit 800 to receive position data provided by a satellite network, such as the Global Positioning System (GPS), the Global Navigation Satellite System (GLONASS) or Galileo.

Communications interface 890 may enable computing device 400 to interface with external devices, either directly or via network, via connection 480C. Communications interface 480 may for example enable computing device 400 to couple to a wired or wireless network, such as Ethernet, Wifi, a Controller Area Network (CAN) bus or any bus system appropriate in vehicles. For example, automotive control unit 800 may be coupled with the automotive sensors 200 in order to perform method 100 or may be coupled to the engine and the breaks in order to control the vehicle based on the perception date generated by method 100. Communications interface may also include a USB port or a serial port to enable direct communication with an external device.

Automotive control unit 800 may be integrated with the vehicle, e.g. directly beneath the cabin of the vehicle or in the trunk of the vehicle.

The invention may further be illustrated by the following examples.

In an example, a method for generating a fused automotive sensor data graph, comprises obtaining a plurality of automotive sensor data graphs, each automotive sensor data graph being based on sensor data captured by a corresponding automotive sensor of a plurality of automotive sensors. Each automotive sensor data graph comprises a plurality of sensor data nodes and a plurality of sensor data edges. Each sensor data node includes sensor data captured by the corresponding automotive sensor. Each sensor data edge defines a sensor distance relationship between two sensor data nodes of the plurality of sensor data nodes. The example method further comprises obtaining at least one calibration matrix. The at least one calibration matrix defines a transformation between respective pluralities of sensor data nodes of at least two automotive sensor data graphs. The example method further comprises generating the fused automotive sensor data graph based on the plurality of automotive sensor data graphs and the at least one calibration matrix. The fused automotive sensor data graph comprises a plurality of fused sensor data nodes and a plurality of fused sensor data edges. The plurality of fused automotive sensor data nodes includes all pluralities of sensor data nodes. The plurality of fused automotive sensor data edges comprises all pluralities of sensor data edges and a plurality of fusion edges. Each fusion edge defines a fusion distance relationship between two sensor data nodes of two pluralities of sensor data nodes. The example method further comprises providing the fused automotive sensor data graph to an automotive perception function. The automotive perception function is implemented by a graph neural network and is configured to generate perception data based on the fused automotive sensor data graph.

In the example method, the perception data may be configured to be processed by one or more advanced driver assistance systems.

The example method may further comprise translating each automotive sensor data graph from a sensor coordinate system of the corresponding sensor to a vehicle coordinate system.

The example method may further comprise generating each automotive sensor data graph using a feature extractor configured to extract one or more features of the corresponding automotive sensor.

The example method may further comprise reducing the plurality of nodes and the plurality of edges of each automotive sensor data graph using one of an autoencoder, principal component analysis, clustering or distance based grouping.

In the example method, the obtaining the plurality of automotive sensor data graphs may comprise receiving the sensor data captured by each automotive sensor and generating each automotive sensor data graph based on the sensor data captured by the corresponding automotive sensor.

In the example method, the sensor distance relationship may be one of a n-nearest-neighbors relationship, a fixed-radius-relationship and a weighted-distance-relationship.

In the example method, the at least one calibration matrix may be based on a calibration of two automotive sensors with regard to one another.

In the example method, the generating the fused automotive sensor data graph may comprise generating each fusion edge between two sensor data nodes of two pluralities of sensor data nodes by determining a distance between the two sensor data nodes based on the at least one calibration matrix.

In the example method, the obtaining the at least one calibration matrix may comprise obtaining a plurality of calibration matrices, each calibration matrix defining a transformation between respective pluralities of sensor data nodes of two respective automotive sensor data graphs.

In the example method, the generating the fused automotive sensor data graph may comprise generating each fusion edge between the two sensor data nodes of the two pluralities of sensor data nodes by determining a distance between the two sensor data nodes based on a corresponding calibration matrix of the plurality of calibration matrices.

In the example method, the fusion distance relationship may be one of a n-nearest-neighbors relationship, a fixed-radius-relationship and a weighted-distance-relationship.

In an example, an automotive control unit comprises at least one processing unit and a memory coupled to the at least one processing unit and configured to store machine-readable instructions. The machine-readable instructions cause the at least one processing unit to obtain a plurality of automotive sensor data graphs. Each automotive sensor data graph is based on sensor data captured by a corresponding automotive sensor of a plurality of automotive sensors. Each automotive sensor data graph comprises a plurality of sensor data nodes and a plurality of sensor data edges. Each sensor data node includes sensor data captured by the corresponding automotive sensor. Each sensor data edge defines a sensor distance relationship between two sensor data nodes of the plurality of sensor data nodes. The machine-readable instructions further cause the at least one processing unit to obtain at least one calibration matrix. The at least one calibration matrix defines a transformation between respective pluralities of sensor data nodes of at least two automotive sensor data graphs. The machine-readable instructions further cause the at least one processing unit to generate the fused automotive sensor data graph based on the plurality of automotive sensor data graphs and the at least one calibration matrix. The fused automotive sensor data graph comprises a plurality of fused automotive sensor data nodes and a plurality of fused automotive sensor data edges. The plurality of fused automotive sensor data nodes includes all pluralities of sensor data nodes. The plurality of fused automotive sensor data edges comprises all pluralities of sensor data edges and a plurality of fusion edges. Each fusion edge defines a fusion distance relationship between two sensor data nodes of two pluralities of sensor data nodes. The machine-readable instructions further cause the at least one processing unit to provide the fused automotive sensor data graph to an automotive perception function. The automotive perception function is implemented by a graph neural network and is configured to generate perception data based on the fused automotive sensor data graph.

In the example automotive control unit, the machine-readable instructions further cause the at least one processing unit to perform any one of the preceding example methods.

In an example, a vehicle comprises a plurality of automotive sensors, and the preceding example automotive control unit.

The preceding description has been provided to illustrate automotive perception based on a fused sensor graph. It should be understood that the description is in no way meant to limit the scope of the present disclosure to the precise embodiments discussed throughout the description. Rather, the person skilled in the art will be aware that the examples of the present disclosure may be combined, modified or condensed without departing from the scope of the present disclosure as defined by the following claims.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for generating a fused automotive sensor data graph, the method comprising:

obtaining a plurality of automotive sensor data graphs, each automotive sensor data graph being based on sensor data captured by a corresponding automotive sensor of a plurality of automotive sensors, wherein:

each automotive sensor data graph comprises a plurality of sensor data nodes and a plurality of sensor data edges, each sensor data node includes sensor data captured by the corresponding automotive sensor, and each sensor data edge defines a sensor distance relationship between two sensor data nodes of the plurality of sensor data nodes;

obtaining at least one calibration matrix, the at least one calibration matrix defining a transformation between respective pluralities of sensor data nodes of at least two automotive sensor data graphs;

generating the fused automotive sensor data graph based on the plurality of automotive sensor data graphs and the at least one calibration matrix, wherein:

the fused automotive sensor data graph comprises a plurality of fused sensor data nodes and a plurality of fused sensor data edges, the plurality of fused automotive sensor data nodes includes all pluralities of the plurality of sensor data nodes, the plurality of fused automotive sensor data edges comprises all pluralities of the plurality of sensor data edges and a plurality of fusion edges, and each fusion edge defines a fusion distance relationship between two sensor data nodes of two pluralities of sensor data nodes; and providing the fused automotive sensor data graph to an automotive perception function, the automotive perception function being implemented by a graph neural network and being configured to generate perception data based on the fused automotive sensor data graph.

2. The method of claim 1, wherein the perception data is configured to be processed by one or more advanced driver assistance systems.

3. The method of claim 1, further comprising:

translating each automotive sensor data graph from a sensor coordinate system of the corresponding automotive sensor to a vehicle coordinate system.

4. The method of claim 1, further comprising:

generating each automotive sensor data graph using a processor configured to extract one or more features of the corresponding automotive sensor.

5. The method of claim 1, further comprising:

reducing the plurality of nodes and the plurality of edges of each automotive sensor data graph using one of an autoencoder, principal component analysis, clustering or distance-based grouping.

6. The method of claim 1, wherein the obtaining the plurality of automotive sensor data graphs comprises:

receiving the sensor data captured by each automotive sensor; and generating each automotive sensor data graph based on the sensor data captured by the corresponding automotive sensor.

7. The method of claim 1, wherein the sensor distance relationship is one of an n-nearest-neighbors relationship, a fixed-radius-relationship and a weighted-distance-relationship.

8. The method of claim 1, wherein the at least one calibration matrix is based on a calibration of two automotive sensors with regard to one another.

9. The method of claim 1, wherein the generating the fused automotive sensor data graph comprises:

generating each fusion edge between two sensor data nodes of two pluralities of sensor data nodes by determining a distance between the two sensor data nodes based on the at least one calibration matrix.

10. The method of claim 1, wherein the obtaining the at least one calibration matrix comprises:

obtaining a plurality of calibration matrices, each calibration matrix defining a transformation between respective pluralities of sensor data nodes of two respective automotive sensor data graphs.

11. The method of claim 10, wherein the generating the fused automotive sensor data graph comprises:

generating each fusion edge between the two sensor data nodes of the two pluralities of sensor data nodes by determining a distance between the two sensor data nodes based on a corresponding calibration matrix of the plurality of calibration matrices.

12. The method of claim 1, wherein the fusion distance relationship is one of an n-nearest-neighbors relationship, a fixed-radius-relationship and a weighted-distance-relationship.

13. An automotive control unit, comprising:

at least one processor; and a memory coupled to the at least one processor and configured to store machine-readable instructions, wherein the machine-readable instructions cause the at least one processor to:

obtain a plurality of automotive sensor data graphs, each automotive sensor data graph being based on sensor data captured by a corresponding automotive sensor of a plurality of automotive sensors, wherein:

each automotive sensor data graph comprises a plurality of sensor data nodes and a plurality of sensor data edges, each sensor data node includes sensor data captured by the corresponding automotive sensor, and each sensor data edge defines a sensor distance relationship between two sensor data nodes of the plurality of sensor data nodes;

obtain at least one calibration matrix, the at least one calibration matrix defining a transformation between respective pluralities of sensor data nodes of at least two automotive sensor data graphs;

generate a fused automotive sensor data graph based on the plurality of automotive sensor data graphs and the at least one calibration matrix, wherein:

the fused automotive sensor data graph comprises a plurality of fused automotive sensor data nodes and a plurality of fused automotive sensor data edges, the plurality of fused automotive sensor data nodes includes all pluralities of the plurality of sensor data nodes, the plurality of fused automotive sensor data edges comprises all pluralities of the plurality of sensor data edges and a plurality of fusion edges, and each fusion edge defines a fusion distance relationship between two sensor data nodes of two pluralities of sensor data nodes; and provide the fused automotive sensor data graph to an automotive perception function, the automotive perception function being implemented by a graph neural network and being configured to generate perception data based on the fused automotive sensor data graph.

14. The automotive control unit of claim 13, wherein the machine-readable instructions further cause the at least one processor to:

translate each automotive sensor data graph from a sensor coordinate system of the corresponding automotive sensor to a vehicle coordinate system.

15. The automotive control unit of claim 13, wherein the machine-readable instructions further cause the at least one processor to:

generate each automotive sensor data graph by extracting one or more features of the corresponding automotive sensor.

16. The automotive control unit of claim 13, wherein the machine-readable instructions further cause the at least one processor to:

reduce the plurality of nodes and the plurality of edges of each automotive sensor data graph using one of an autoencoder, principal component analysis, clustering or distance-based grouping.

17. The automotive control unit of claim 13, wherein the machine-readable instructions further cause the at least one processor to:

receive the sensor data captured by each automotive sensor; and generate each automotive sensor data graph based on the sensor data captured by the corresponding automotive sensor.

18. The automotive control unit of claim 13, wherein the sensor distance relationship is one of an n-nearest-neighbors relationship, a fixed-radius-relationship and a weighted-distance-relationship.

19. A vehicle, comprising:

a plurality of automotive sensors; and the automotive control unit of claim 13.

20. The automotive control unit of claim 13, wherein the machine-readable instructions further cause the at least one processor to control at least one of an engine or brakes of a vehicle based on the perception data.

* * * * *